Sept. 8, 1959 P. V. MALLOY 2,903,253
LONG WALL MINING MACHINE USING CONVEYOR
DRIVEN POWER TAKE-OFF MEANS
Filed Dec. 18, 1956 5 Sheets-Sheet 1
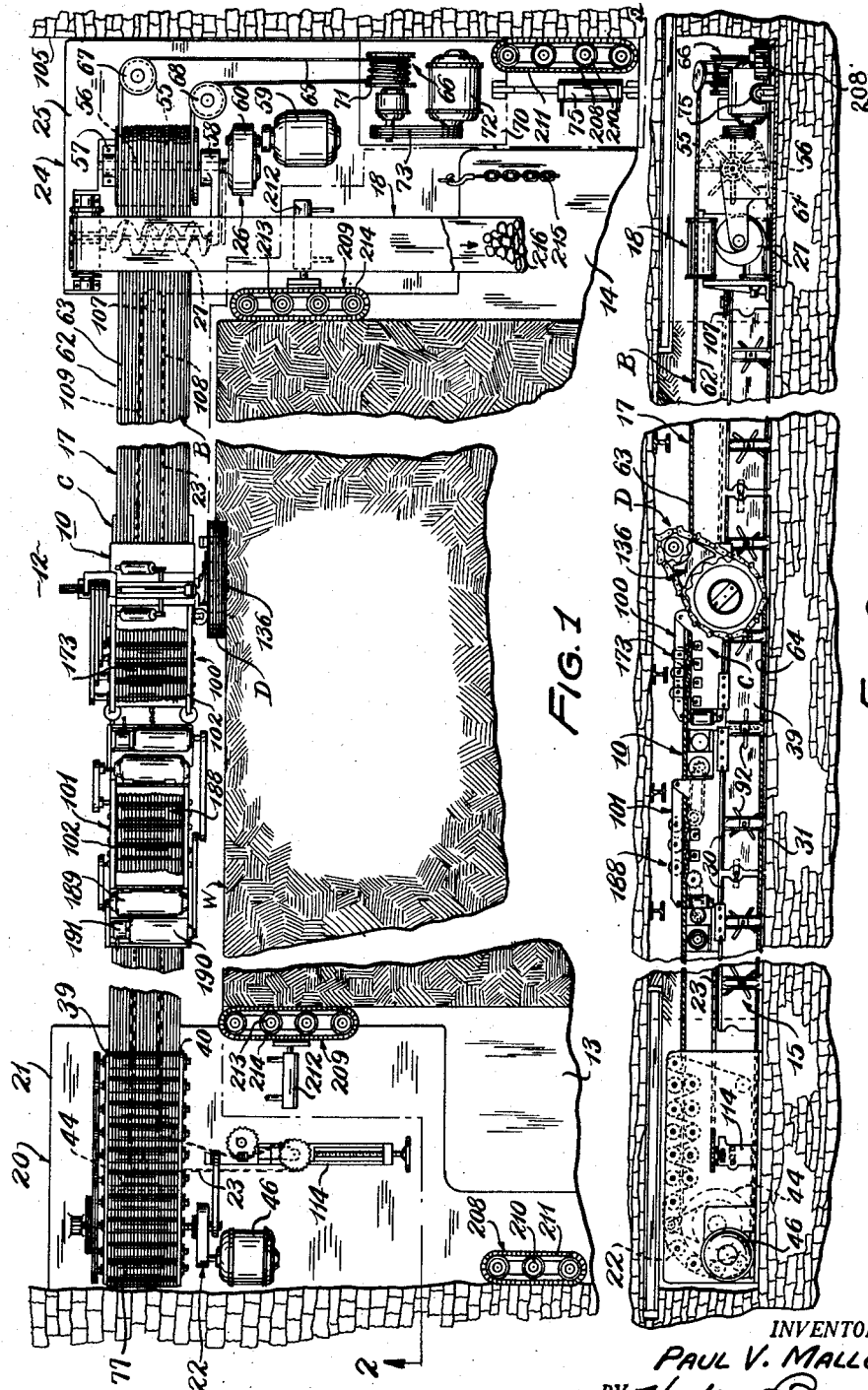
INVENTOR.
PAUL V. MALLOY
BY Hudson, Coughton,
Williams, David & Hoffmann
ATTORNEYS

INVENTOR.
PAUL V. MALLOY

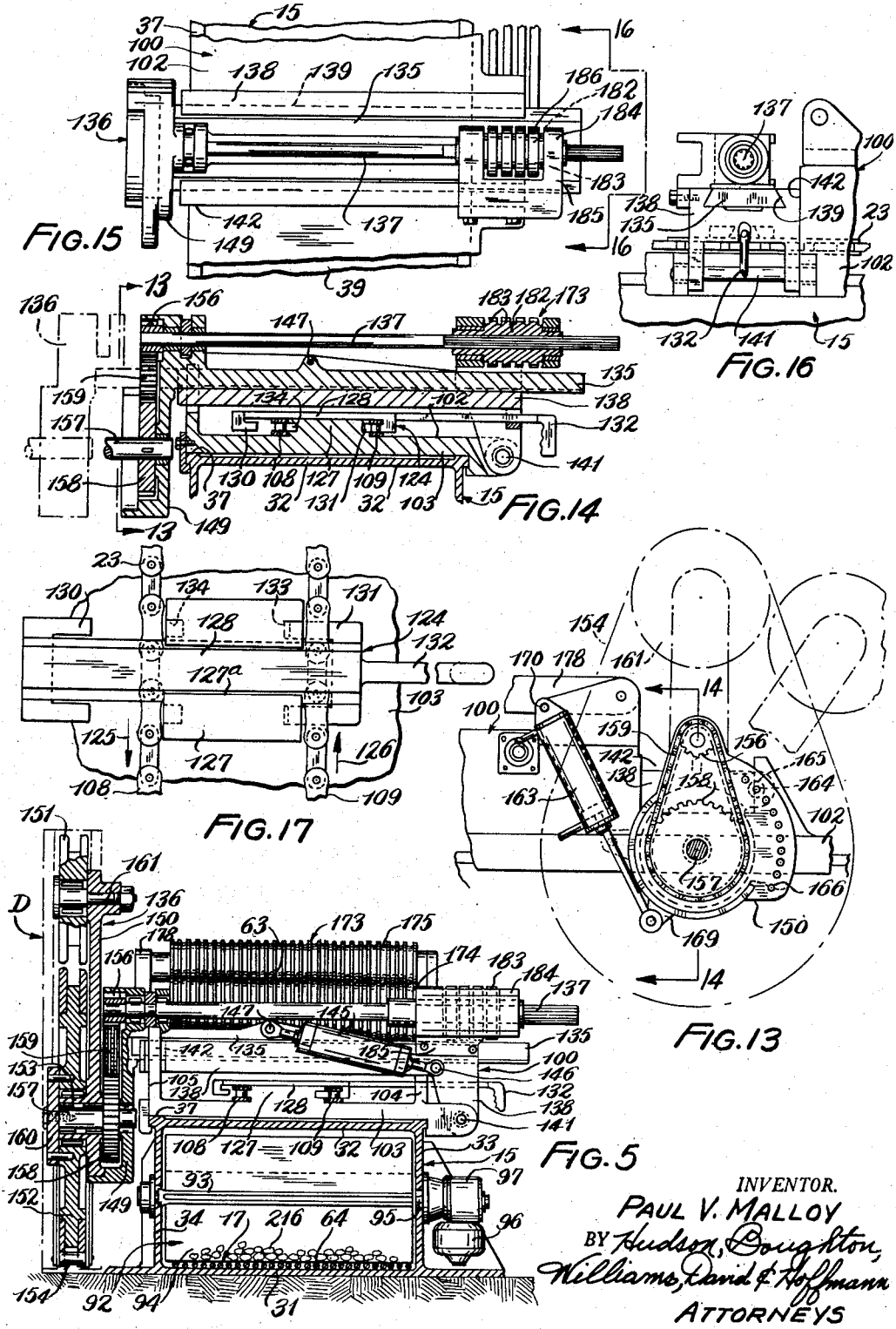

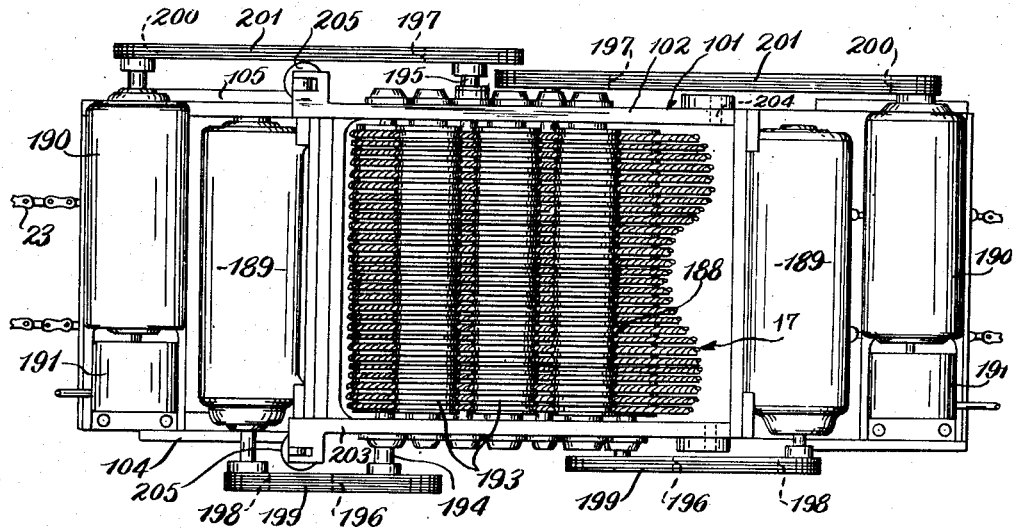
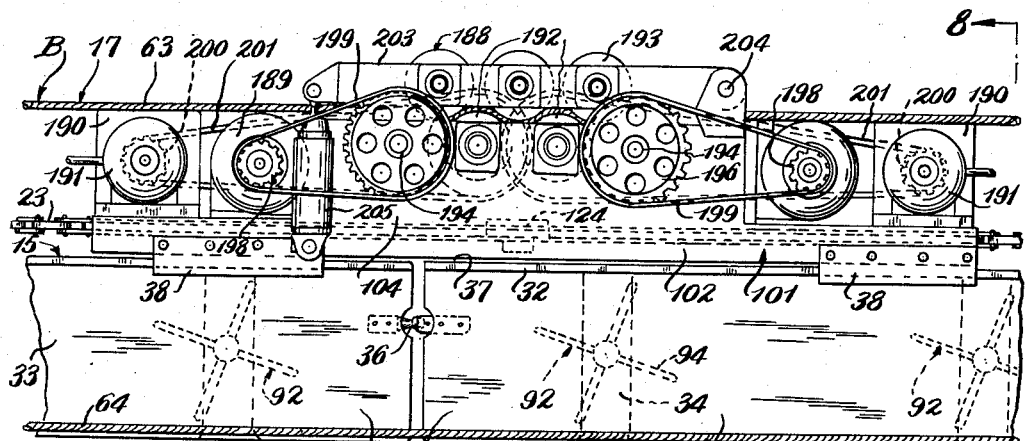
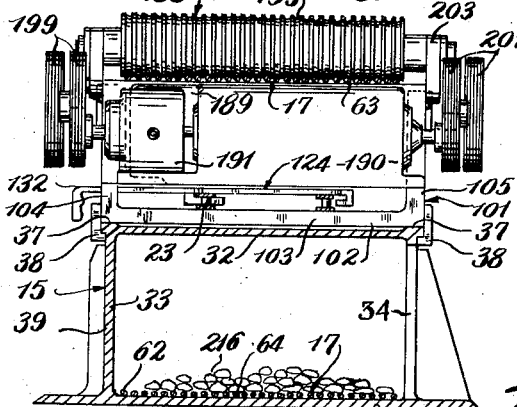
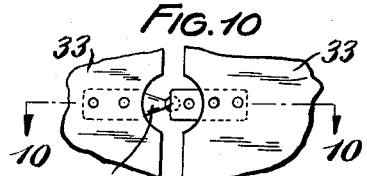

Sept. 8, 1959

P. V. MALLOY 2,903,253

LONG WALL MINING MACHINE USING CONVEYOR
DRIVEN POWER TAKE-OFF MEANS

Filed Dec. 18, 1956

INVENTOR.
PAUL V. MALLOY
BY Hudson Boughton,
Williams, David & Hoffmann
ATTORNEYS

United States Patent Office 2,903,253
Patented Sept. 8, 1959

2,903,253

LONG WALL MINING MACHINE USING CONVEYOR DRIVEN POWER TAKE-OFF MEANS

Paul V. Malloy, Lakewood, Ohio

Application December 18, 1956, Serial No. 629,037

12 Claims. (Cl. 262—30)

This invention relates to mining apparatus and, more particularly, to mining apparatus for use in long wall mining.

An object of this invention is to provide novel apparatus for long wall mining in which a conveyor adapted to extend along the mine wall comprises a conveyor frame and a driven endless belt means thereon, and in which material dislodging means engageable with the wall is actuated from said belt means through power take-off means drivingly engaged by the latter.

Another object is to provide mining apparatus of this character in which the material dislodging means is supported by carriage means movable along the conveyor frame, and in which the dislodging means is preferably movable relative to the carriage means and adapted to be driven while in engagement with the wall.

Still another object is to provide mining apparatus of the kind above indicated in which a supporting means for the material dislodging means provides for movement of the dislodging means in a direction transversely of the conveyor and also provides for swinging of the dislodging means relative to the carriage means.

A further object is to provide mining apparatus of the type above referred to in which power medium supply means is driven through power take-off means drivingly engaged by the conveyor belt means, and in which the power medium supply means is preferably located on the carriage means and supplies power medium to various power devices including power devices for producing the transverse and swinging movements of the material dislodging means.

Yet another object is to provide mining apparatus of the type mentioned above in which the carriage means is propelled along the conveyor frame for moving the dislodging means along the mine wall.

This invention further provides mining apparatus of the kind above indicated in which the conveyor belt means comprises an endless strand having substantially parallel strand loops extending around spaced support pulleys and defining reaches movable along the conveyor frame, and in which a portion of the strand preferably defines a tensioning and driving loop engaged by a driven pulley.

The invention likewise provides mining apparatus of the character already indicated above in which the reaches of the conveyor belt means comprise an upper power supply reach and a lower load transporting reach, and in which the conveyor frame comprises flexibly connected frame sections for accommodation to mine floor unevenness, the lower reach being retained adjacent the bottom of the conveyor frame by rotatable reel members to facilitate loading of the material with minimum lifting thereof.

Additionally, this invention provides mining apparatus for use adjacent a long wall having longitudinally spaced transverse openings and in which the conveyor means includes end units extending into such openings and engaging the side walls thereof.

The invention can be further briefly summarized as consisting in certain novel combinations and arrangements of parts hereinafter described in detail and particularly set out in the claims hereof.

In the accompanying sheets of drawings forming a part of this specification:

Fig. 1 is a broken top plan view of a mining installation utilizing the mining apparatus of the present invention;

Fig. 2 is a broken side elevational view of the mining installation and apparatus of Fig. 1;

Fig. 5 is a vertical transverse section through the material dislodging mechanism and taken substantially on section line 5—5 of Fig. 4;

Fig. 6 is a fragmentary side elevational view of the mining apparatus of Fig. 1 showing one of the power take-off mechanisms;

Fig. 7 is a fragmentary top plan view of the power take-off mechanism of Fig. 6;

Fig. 8 is a transverse vertical section taken through the mining apparatus substantially on section line 8—8 of Fig. 6 and showing the power take-off mechanism of the latter view in end elevation;

Fig. 9 is a fragmentary side elevational view of a flexible coupling of the conveyor frame;

Fig. 10 is a sectional view of the flexible coupling taken substantially on section line 10—10 of Fig. 9;

Fig. 13 is a partial side elevational view further illustrating a portion of the material dislodging mechanism of Fig. 4 and showing different positions to which the cutter head is adjustably movable;

Fig. 14 is a partial transverse vertical sectional view taken substantially on section line 14—14 of Fig. 13, and showing mounting and driving means for the cutting head;

Fig. 15 is a fragmentary top plan view of the cutter head mounting and driving means of Fig. 14;

Fig. 16 is a fragmentary side elevation of the cutter head mounting and driving means when viewed as indicated by the directional line 16—16 of Fig. 15; and Fig. 17 is a fragmentary top plan view showing, in detached relation, the locking means for releasably connecting the carriage means with its propelling means.

Figure 3:
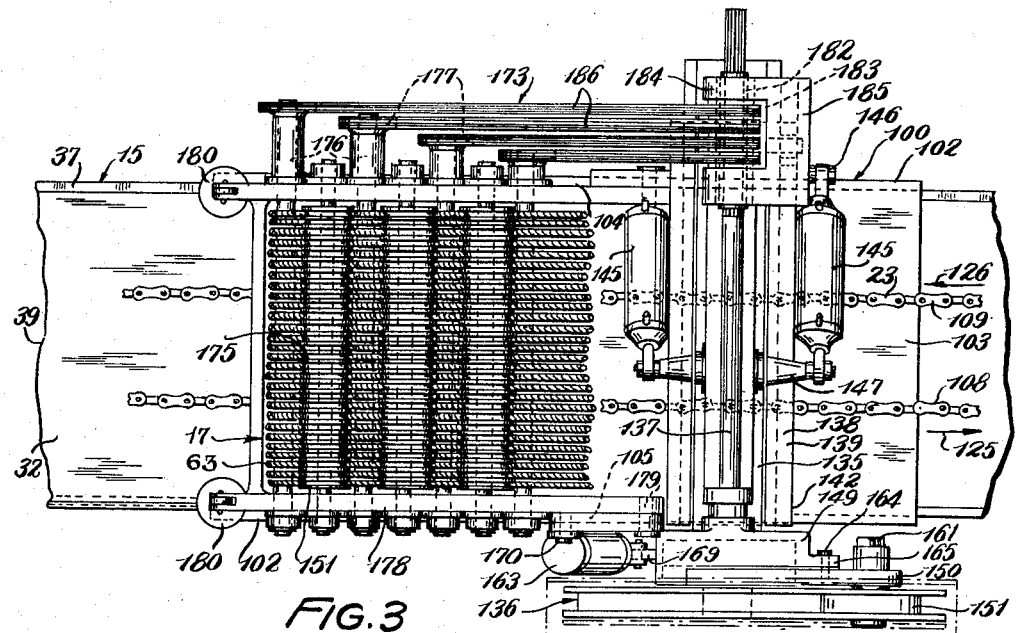
Fig. 3 is a fragmentary top plan view of the mining apparatus of Fig. 1 showing the material dislodging mechanism.

Referring now to the accompanying drawings in greater detail, the mining apparatus 10 of the present invention is utilized to operate on the vertical face of a so-called "long wall" W of a mining installation having a working area 12 which includes adjoining access passageways 13 and 14 and wherein material such as coal is to be removed.

The mining apparatus 10 comprises, in general, a main conveyor B extending along the wall W, and a carriage C movable along the conveyor and supporting a material dislodging means D which is engageable with the wall. The conveyor B comprises an elongated horizontally extending frame 15, Figs. 2 and 6, for placement in working area 12 and on which the carriage C is longitudinally movable and supports the material dislodging mechanism D, the latter being supported and arranged to be slidably movable relatively to the carriage and transversely of the frame into engagement with wall W for removal of predetermined successive layers of material therefrom.

The conveyor B also comprises an endless main belt 17 extending longitudinally of the frame 15 and supported adjacent the ends of the latter. The belt 17 provides means to actuate the material dislodging mechanism D and to transport the dislodged material, hereinafter referred to merely as coal, to a delivery conveyor 18 for its eventual removal through access passageway 14. In the present instance only one material dislodging mechanism D is shown, but it is understood that a plurality of such mechanisms may be utilized on the same conveyor and operated from the conveyor belt thereof.

A combined anchorage and drive unit 20 is provided at one end of the main conveyor B and is disposed in the access passage 13. The unit 20 is provided with a base 21 to which one end of the conveyor frame 15 is bolted or otherwise suitably secured. The unit 20 also includes a drive mechanism 22 for cooperation with one end of the conveyor belt 17 for supporting and driving the same. The drive mechanism 22 also actuates an endless drive chain 23 for moving the carriage C and the material dislodging mechanism D longitudinally along the frame 15.

A second combined anchorage and drive unit 24 is provided at the other end of the main conveyor B and is disposed in the access passage 14. The unit 24 is provided with a suitable base 25 to which the other end of the conveyor frame 15 is bolted or otherwise suitably secured. The unit 24 includes a drive mechanism 26 which coperates with the other end of the conveyor belt 17 for supporting and driving the same. The drive mechanism 26 also actuates a material transferring device 27 extending transversely of the main conveyor B and which is operable to transfer dislodged material from such main conveyor to the delivery conveyor 18.

Describing more specifically the above apparatus, the conveyor frame 15 comprises a plurality of substantially longitudinally aligned frame sections 30 which are of a substantially rectangular box-like form in cross-section. The frame sections 30 each comprise a longitudinal bottom plate or base 31 and a longitudinal top wall 32 connected with such base by an upright longitudinal rear side wall 33. Along the side of the frame sections facing the mine wall W, the bottom wall 31 and the top wall 32 are connected at longitudinally spaced points by stanchions 34. The spaces 35 between the stanchions admit the dislodged material to the interior of the frame sections.

The frame sections 30 are disposed in an end-to-end relation along the mine wall W and their adjacent ends are connected together by ball-joint couplings 36. These couplings provide flexibilty such that the frame 15 will conform to an uneven mine floor.

Adjacent the longitudinal edges of the frame 15, portions of the top wall 32 form ways 37 on which the carriage C is movable as by sliding therealong. The carriage is retained on the ways 37 by clips 38 which are secured to the carriage and engage under projecting edge portions of the ways, as shown in Figs. 6 and 8.

Figure 11:
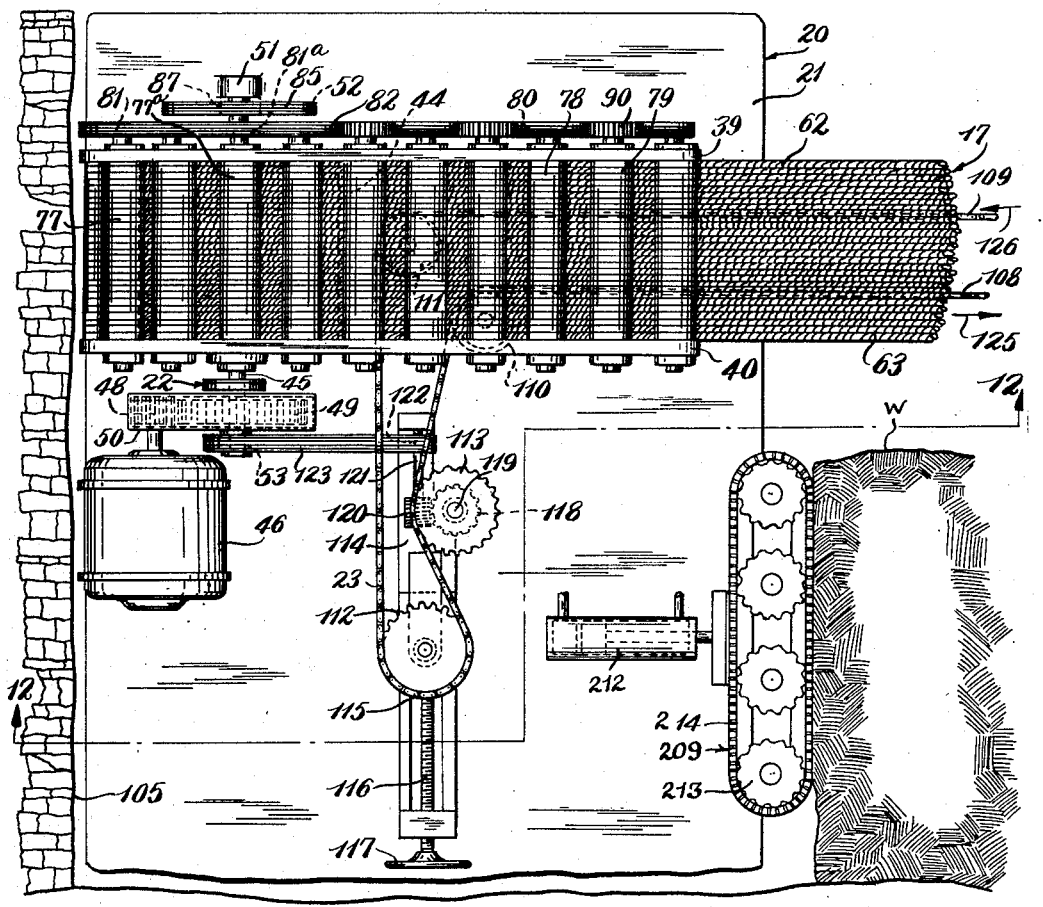
Fig. 11 is a fragmentary top plan view corresponding with a portion of Fig. 1 but on a larger scale and showing the main drive mechanism for the conveyor belt.

The drive mechanism 22 of the unit 20 comprises a pair of spaced upright walls 39 and 40 rising above the base 21 and a cylindrical drive pulley or drum 44 fixed on a transverse shaft 45 which is rotatably mounted on such walls. One end of the belt 17, in this case the left end as seen in Figs. 1 and 11, extends around the pulley 44 so as to be supported and driven thereby. An electric driving motor 46 mounted on the base 21 is connected with the shaft 45, as by cooperating pinion and gear members 48 and 49 located in a gear case 50. A portion of the shaft 45 projecting beyond the wall 39 is supported by an outboard bearing 51. For a purpose to be presently explained, a pair of sprockets 52 and 53 are provided in fixed relation on the shaft 45 adjacent the ends thereof.

The drive mechanism 26 of the unit 24 comprises a drive pulley 55 in the form of a reel fixed on a transverse shaft 56 which is rotatable in bearings 57 and 58 provided on the base 25. The shaft 56 is driven by an electric driving motor 59 through a gear unit 60. The right end of the conveyor belt 17 extends around the pulley 55 so as to be supported and driven by such pulley. As shown in Fig. 2, the pulley 55 comprises an annular group of divergent radial blades 61 projecting from a central hub. The spaces between the radiating blades 61 enable any coal that may be transported beyond the transferring device 27 to be carried around by the pulley 55 and returned thereby to the transferring device.

In the present invention, the main conveyor belt 17 comprises an endless strand of wire rope 62 arranged to extend around the pulleys 44 and 55 in parallel loops with the strands of the adjacent loops in a side-by-side relation so as to define upper and lower reaches 63 and 64. The upper reach 63 can be referred to as a power reach and travels from right to left above the conveyor frame 15. The lower reach 64 moves from left to right inside the conveyor frame 15 and is a load transporting reach which advances the coal toward the delivery conveyor 18.

A loop portion 65 of the rope 62 is lead from the pulley 55 and extends to an auxiliary driving and tensioning device 66. One strand of the loop 65 is an extension of the edge strand of one side of the upper reach 63 and the other strand of the loop is an extension of the edge strand of the opposite side of the lower reach 64. The loop 65 is guided to the device 66 by suitable sheaves 67 and 68.

The auxiliary driving and tensioning device 66 comprises a plate 70 which is shiftable on the base 25 of the unit 24 and a pulley 71 driven by an electric motor 72 through a belt 73. The pulley 71 and the motor 72 are supported by the plate 70. The loop 65 has several turns thereof wrapped around the pulley 71 so as to enable this pulley to drive the loop and thus propel, or assist in propelling, the belt 17. A power cylinder device 75 having its ends connected with the base 25 and the plate 70 is operable to shift the latter in a direction to tension the loop 65 and thus tighten the belt 17 on the pulleys 44 and 55.

The pulley 44 of the drive mechanism 22 has parallel peripheral grooves therein in which the strands of the adjacent loops of the belt 17 lie. The transverse edges of the radial plates 61 of the pulley 55 preferably also have grooves therein for the adjacent strands of the belt 17. The strands of the belt 17 are pressed into the grooves of the pulley 44 by pressure rollers 77 arranged peripherally of such pulley and supported for rotation by the spaced walls 39 and 40 of the unit 20.

Figure 12:
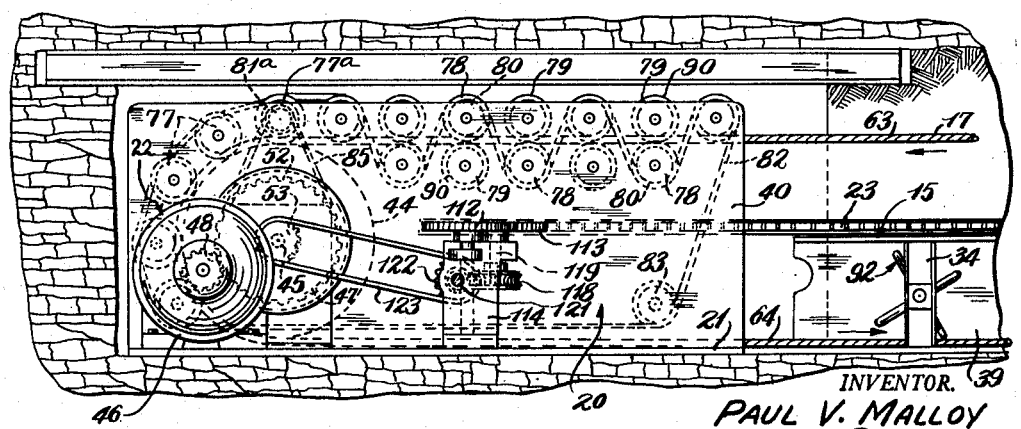
Fig. 12 is a side elevational view of the main drive mechanism of Fig. 11.

The propelling action of the drive mechanism 22 on the belt 17 is augmented by providing this mechanism with pairs of cooperating driving and backing rollers 78 and 79 between which the upper reach 63 extends as shown in Figs. 11 and 12. These driving and backing rollers are arranged in alternating relation above and below the belt 17 and are rotatably supported by the spaced walls 39 and 40. The driving rollers 78 have gears 80 in fixed connection therewith and similar gears 81 are provided on the shafts of the pressure rollers 77.

A toothed belt of chain 82 extends around the gears 80 and 81 of the driving and pressure rollers 78 and 77 and passes over an idler gear 83. The gear of one of the pressure rollers, in this case, the gear 81$^a$ of the pressure roller 77$^a$ serves as a driving gear for the belt 82. This pressure roller 77$^a$ is driven from the through shaft 45 by a chain 85. For this purpose, the shaft 45 is provided with the above-mentioned sprocket 52 and the pressure roller 77$^a$ is provided with a sprocket 87 adjacent the gear 81$^a$ and the drive chain 85 extends around these sprockets.

Each of the backing rollers 79 is in vertically adjacent relation to its associated driving roller 78, as shown in Fig. 12, and is preferably driven from such associated driving roller. This is achieved by providing each backing roller with a fixed gear 90 which meshes with the gear 80 of the associated driving roller.

Figure 4:
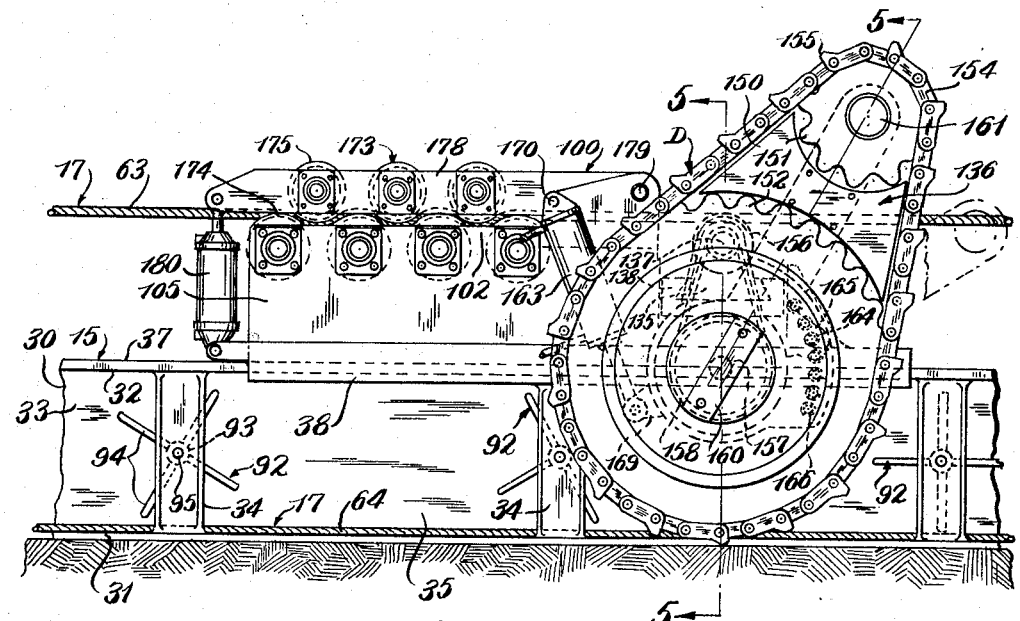
Fig. 4 is a side elevational view of the material dislodging mechanism of Fig. 3.

Means is provided for retaining the load transporting reach 64 of the conveyor belt 17 adjacent the base 31 of the frame 15 so as to permit the belt to be maintained taut and the facilitate the loading of the coal onto the lower reach. This retaining means comprises a plurality of guide reels 92, Figs. 2, 4 and 5, each having a central hub 93 and a group of blades or arms 94 radiating therefrom. The reels 92 are spaced longitudinally along the frame 15 and are rotatably supported thereon by means of transversely extending shafts 95 on which the hubs are secured.

During the rotation of the reels 92, the transverse edges of their blades 94 come into engagement in succession with the lower reach 64 and depress the latter toward the bottom of the conveyor frame. The blades 94 straddle the coal on the lower reach 64 as the reels are rotated, and hence, the reels do no obstruct the advance movement of the coal. The reels can be driven by the engagement of the lower reach with their blades 94, but preferably, the reels are driven by individual power devices each comprising an electric motor 96 operatively connected with the shaft 95 through a suitable gear unit 97, as shown in Fig. 5.

The carriage C is here shown as comprising two adjacent carriage units 100 and 101 of which the carriage unit 100 carries the dislodging mechanism D and the carriage unit 101 is a generating unit. Each of the carriage units 100 and 101 has a suitable frame 102 which includes a base 103 slidable on the ways 37 and a pair of side walls 104 and 105 connected with the base and extending thereabove. The carriage units 100 and 101 are propelled along the frame 15 by the above-mentioned endless drive chain 23.

The drive chain 23 extends around an idler sprocket 107 so as to provide two oppositely movable reaches 108 and 109 which extend over two idler sprockets 110 and 111. A bight of the chain 23 extends around a tightening sprocket 112 and is engaged by a drive sprocket 113. The sprockets 112 and 113 are supported by an auxiliary frame 114 mounted on the base 21 of the unit 20.

The sprocket 112 is mounted on a slide 115 which is movable in a guideway of the frame 114 for varying the tautness of the chain 23. The adjusting movement of the slide 115 is imparted thereto by a rotatable screw 116 actuated by a handwheel 117.

The drive sprocket 113 is connected with a worm gear 118 by a shaft 119 so as to propel the chain 23 when the worm gear is rotated by a worm 120 meshing therewith. The worm 120 is fixed on a shaft 121 which carries a sprocket 122. The sprocket 122 is driven from the shaft 45 of the drive unit 22 by a chain 123 extending around the above-mentioned sprocket 53.

Each of the carriage units 100 and 101 is provided with a clutch means 124 for releasably connecting the same with a desired one of the reaches 108 and 109 of the chain 23, depending on which direction the carriage unit is to be propelled along the frame 15. The actuation of the chain 23 is such that the reach 108 always moves toward the right, as indicated by the arrow 125, and the reach 109 always moves toward the left as indicated by the arrow 126. As shown in Fig. 17, the clutch means 124 comprises a clutch block 127 and on the base of the carriage unit between the reaches 108 and 109, and a clutch fork 128 slidable in a guideway 127ᵃ of the block and shiftable in a direction transversely of the conveyor frame 15.

The clutch fork 128 has pairs of fingers 130 and 131 which are selectively engageable in openings of the links of the chain 23, and a handle 132 adapted to be grasped for shifting the clutch fork. The clutch block has pairs of openings 133 and 134 therein to receive the ends of the fingers which have been moved through the chain links. Thus, when the carriage units 100 and 101 are to be propelled toward the right along the conveyor frame 15, the clutch fork 128 is moved to engage the fingers 130 in the links of the reach 108, and when the units are to be propelled toward the left the clutch fork is moved to engage the fingers 131 in links of the reach 109. When the clutch fork 128 occupies an intermediate position with both sets of fingers disengaged from the chain 23, the carriage units will remain stationary.

The material dislodging means D comprises a slide 135 movable transversely of the carriage unit 100 and a cutter head 136 supported by the slide and actuated by a rotatable shaft 137. The dislodging mechanism D also comprises a support arm 138 having a dovetail guideway 139 therein in which the slide 135 is reciprocably movable.

The support arm 138 extends transversely of the carriage unit 100 and has the rear end thereof pivotally connected with the frame 102 of this carriage unit by a hinge pin 141 such that the arm can be swung through limited distances in a vertical plane for raising and lowering the cutter head 136. The forward end of the support arm 138 is received in a vertical guideway or fork recess 142 of the carriage frame 102 which permits such limited vertical swinging of the cutter head. The hinge pin 141 and the fork recess 142 permit the dislodging mechanism to be readily removed from the carriage unit 100.

The slide 135 extends longitudinally in the dovetail guideway 139 and the cutter head 136 is located on the forward end of the slide in overhanging relation to the conveyor frame 15, as shown in Figs. 3 and 5. The slide 135 is shiftable in the guideway 139 by a pair of double acting power cylinder devices 145 for moving the cutter head 136 toward and away from the wall W. The power devices 145 have their cylinder members connected to the heel portion of the support arm 138 by pivot pins 146 and have the outer ends of their piston rods connected to the slide 135 by struts 147 projecting from the latter.

The slide 135 is provided at its forward end with a depending gear case 149 with which the cutter head 136 is associated. The cutter head comprises a carrier 150 swingable relative to the gear case 149 and carrying an idler sprocket 151. The cutter head also comprises a main sprocket 152 rotatable on a hub 153 of the carrier 150, and a cutter chain 154 extending around the main and idler sprockets and carrying cutting elements 155.

The forward end of the drive shaft 137 extends into the gear case 149 and carries a pinion 156. A stub shaft 157 journaled in the gear case and in the hub 153 of the carrier 150 has a gear 158 fixed thereon. The stub shaft is driven by a toothed belt or chain 159 extending around the pinion 156 and the gear 158. The outer end of the stub shaft 157 is drivingly connected with the main sprocket 152 by a cover plate 160. The idler sprocket 151 is mounted on the carrier 150 in eccentric relation to the stub shaft by a suitable pivot pin 161.

With the construction just described for the cutter head 136, it will be seen that the cutter chain 154 will be driven from he shaft 137 through the stub shaft 157 and the main sprocket 152. Since the carrier 150 is swingable about the axis of the stub shaft 157, it will also be seen that the cutter head can be swingably adjusted to different angular positions of the idler sprocket, depending upon the thickness of the mine seam on which the dislodging mechanism is intended to operate.

The cutter head 136 is swingable to such different angular positions by a double acting power cylinder device 163, and is retained in the adjusted position by a locking pin 164 insertable through a lug projection 165 of the gear case 149 and engageable in a selected opening of an arcuate row of openings 166 of the carrier 150. The cylinder 168 of the power device 163 has its piston rod pivotally connected with an arm 169 projecting from the carrier 150, and has its upper end pivotally connected with the carriage frame 102 by a pivot pin 170.

In the present invention the cutting means of the cutter head 136 is driven from the upper or power reach 63 of the main conveyor belt 17. For this purpose the carriage unit 100 is provided with a power take-off means 173 for supplying power to the drive shaft 137. The power take-off means 173 comprises peripherally grooved driven rollers 174 and backing rollers 175 extending across the reach 63. The driven rollers 174 are rotatably mounted in the upright walls 104 and 105 of the carriage frame 102 and have shafts 176 projecting for varying distances from the wall 104 and carrying drive gears 177.

The backing rollers 175 are rotatably mounted in a yoke 178 which is swingably connected with the carriage frame 102 by pivot pins 179. The yoke 178 is swung downwardly by a power cylinder device 180 to cause the backing rollers to press the strands of the reach 63 into the grooves of the driven rollers 174 for good driving contact therewith.

The rear end of the drive shaft 137 extends through and is slidably splined in a rotatable member 182 which has a plurality of gears 183 formed thereon. The gear member 182 is rotatable in the spaced arms 184 of a yoke shaped bracket 185 mounted on the support arm 138. The gear member 182 is driven by the rollers 174 through a group of toothed belts or chains 186 extending around the gears 177 and 183. Since the shaft 137 is slidably splined in the member 182, the driving connection between the rollers 174 and the cutting means of the cutter head 136 will be maintained for all positions to which the cutter head is shiftable by the slide 135.

The carriage unit 101 is similar to the carriage unit 100 in that it has a frame 102 which is slidable on the conveyor frame 15, and includes the same type of clutch device 124 for engagemnet with one or the other of the reaches 108 and 109 of the propelling chain 23. The carriage unit 101 is a power generating and supply unit which can be used with the carriage unit 100 or independently thereof. The frame of the unit 101 also has a bottom wall or base 103 and spaced upright side walls 104 and 105 rising therefrom.

The carriage unit 101 has power supply devices thereon which are driven from the reach 63 of the main conveyor belt 17 by a power take-off means 188. The power supply devices are here shown as comprising electric generators 189 and fluid pressure generators 190, the latter of which may be air compressors. The unit 101 also includes power medium storage means which is here shown as comprising tanks or accumulators 191 for storing fluid pressure such as air pressure from the fluid pressure generators 190.

The power take-off means 188 comprises driven rollers 192 and backing rollers 193 extending crosswise of the conveyor B below and above the reach 63 of the conveyor belt 17. The driven rollers have peripheral grooves to receive the strands of the conveyor belt and are rotatably supported in the spaced walls 104 and 105 with shaft extensions 194 on certain of these rollers and shaft extensions 195 on others of them. The shaft extensions 194 have gears 196 fixed thereon and the shaft extensions 195 also have gears 197 fixed thereon. The electric generators have gears 198 fixed on the shafts thereof and are driven from the power take-off means 188 by toothed belts or chains 199 extending around the gears 196 and 198. The fluid pressure generators 189 have gears 200 fixed on the shafts thereof and are driven by toothed belts or chains 201 extending around the gears 197 and 200.

The backing rollers 193 serve to press the strands of the reach 63 into the grooves of the driven rollers for good driving engagement of the strands therewith. These backing rollers are rotatably mounted in a yoke 203 which is swingably mounted on the carriage frame 102 by pivot pins 204. A pair of pressure fluid cylinder devices 205 mounted on the carriage unit 101 and connected with the yoke swing the latter downwardly to cause the backing rollers to apply the desired pressure to the reach 63.

The electric generators 189 produce power which can be used in the adjacent mine areas for any desired purposes and reduce the need for power cables of great length which heretofore were required to extend to power sources outside of the mine. The fluid pressure generators 190 supply pressure fluid which can be used for any desired purposes, and in the mining apparatus 10, is used to actuate various power cylinder devices such as the above-mentioned devices 145, 163, 180 and 205. By storing pressure fluid in the tanks 191, power medium will be available for the cylinder devices 145, 163, 180 and 205 immediately upon the mining apparatus 10 being put into operation.

When the mining apparatus 10 is placed in operative position in the mine area 12, the conveyor B extends along the long wall W and the driving and anchorage units 20 and 24 are disposed in the access passages 13 and 14, as shown in Fig. 1. The units 20 and 24 maintain the conveyor B in a desired substantially parallel relation to the wall W. As the carriage means C is moved back and forth along the wall by the propelling chain 23, the cutting means of the cutter head 136 is driven by power supplied by the main conveyor belt 17 and the dislodging means D is thereby effective to dislodge material from the wall W during both directions of travel of the carriage means. The cutter head can be advanced by movement of its support slide 135 for a distance corresponding with the desired thickness of layer to be dislodged from the wall W. As the face of the wall W is thus cut away, the units 20 and 24, and the conveyor B are advanced to enable the dislodging mechanism D to continue to operate on the wall.

In maintaining the conveyor B in the desired position, the end units 20 and 24 cooperate with the side walls of the access passages 13 and 14. For this purpose, the units 20 and 24 are provided with suitable wall-engaging guide devices 208 and with suitable wall-engaging guide and pressure devices 209. The guide devices 208 comprise groups of rollers 210 mounted on the base plates 21 and 25 and an endless belt 211 extending around each such group of rollers and engaging the adjacent side walls of the access passages.

The guide and pressure devices 209 comprise power cylinders 212 mounted on the base plates 21 and 25 and groups of rollers 213 carrying endless belts 214 shiftable by the piston rods of the cylinders for pressing the belts against the adjacent side walls of the access passages. The units 20 and 24 are advanced in the passages 13 and 14 as by means of tractors or winches (not shown) attached to the base plates 21 and 25 as by tow chains 215.

The coal 216 dislodged from the wall W is shoveled or otherwise loaded onto the reach 64 and is carried by the latter to the transfer device 24 which operates to transfer the coal to the delivery conveyor 18.

From the accompanying drawings and the foregoing detailed description it will now be understood that this invention provides novel mining apparatus for carrying out long wall mining in a rapid and economical manner. It will now also be understood that in this invention the conveyor, by which the dislodged coal is removed from the work area, drives the dislodging means and the frame of the conveyor serves as a track means for movement of the carriage of the dislodging means thereon along the mine wall being worked.

From the foregoing description and accompanying drawings it will be readily understood that the advantages and objects as set forth hereinabove have been attained, and although the improved mining apparatus of the present invention has been illustrated and described to a detailed extent, it is not to be regarded as limiting the scope thereof but is intended to include all changes and modifications coming within the terms of the claims hereof.

Having thus described my invention, I claim:

1. In apparatus for long wall mining, a conveyor adapted to be positioned to extend along the mine wall and comprising a stationary conveyor frame and an endless conveyor belt having reaches movable along said frame and at least one of which reaches is a mined-material propelling reach, a mechanism having material dislodging means adapted to be driven and engageable with said wall, said mechanism also comprising a carriage supported by said frame and movable on the latter along said wall for operatively engaging said dislodging means with different portions of the wall, said dislodging means being operably movable relative to the carriage, and power take-off means driven by said belt and operably connected with said dislodging means to actuate the latter.

2. In apparatus for long wall mining, a conveyor adapted to be positioned to extend along the mine wall and comprising a stationary conveyor frame and an endless conveyor belt having reaches movable along said frame, a mechanism having material dislodging means adapted to be driven and engageable with said wall, said mechanism also comprising a carriage supported by said frame and movable on the latter along said wall for operatively engaging said dislodging means with different portions of the wall, said dislodging means being operably movable relative to the carriage, means for propelling said carriage along said frame, and power take-off means driven by said belt and operably connected with said dislodging means to actuate the latter.

3. In apparatus for long wall mining, a stationary conveyor frame adapted to be positioned to extend along the mine wall, support pulleys adjacent the ends of said frame, a conveyor belt comprising an endless strand passing around said support pulleys in substantially parallel loops lying in a side-by-side relation and defining conveyor belt reaches extending between said support pulleys, driving means effective to propel said strand for advancing said reaches, carriage means supported by said frame for movement thereon along said wall, mechanism on said carriage means comprising material dislodging means movable relative to said carriage means and adapted to be driven and being engageable with said wall, and a power take-off means on said carriage means and operably connected with said dislodging means and drivingly engaged by one of said reaches.

4. In apparatus for long wall mining, a stationary conveyor frame adapted to be positioned to extend along the mine wall, support pulleys adjacent the ends of said frame, a conveyor belt comprising an endless strand passing around said support pulleys in substantially parallel loops lying in a side-by-side relation and defining conveyor belt reaches extending between said support pulleys, driving means effective to propel said strand for advancing said reaches, carriage means supported by said frame for movement thereon along said wall, mechanism on said carriage means comprising a material dislodging means movable relative to said carriage means and engageable with said wall and a power take-off means drivingly engaged by one of said reaches and operably connected with said dislodging means to actuate the latter, and means for propelling said carriage means along said frame.

5. In apparatus for long wall mining, a conveyor adapted to be positioned to extend along the mine wall and comprising a stationary conveyor frame and an endless belt having reaches movable along said frame, a carriage having material dislodging means thereon and movable relative thereto and engageable with said wall, said carriage being supported by said frame for movement thereon along said wall, power take-off means on said carriage and driven by said belt and operably connected with said dislodging means to actuate the latter, propelling means extending along said conveyor and co-operating with said carriage to propel the same, and power means for driving said belt and said propelling means.

6. Mining apparatus as defined in claim 5 in which said propelling means comprises a flexible endless means having reaches movable in opposite directions along said conveyor, and which includes connecting means associated with said carriage and selectively engageable with the last-mentioned reaches for causing back-and-forth movement of said carriage along said frame.

7. In apparatus for long wall mining, a conveyor adapted to be positioned to extend along the mine wall and comprising a stationary conveyor frame and an endless conveyor belt having reaches movable along said frame and at least one of which reaches is a mined-material propelling reach, means for driving said belt to advance said reaches, carriage means supported by said frame for movement thereon along said wall, material dislodging means shiftable on said carriage means in a direction transversely of said conveyor for engaging said wall, said dislodging means being adapted to be driven while in engagement with said wall for dislodging material from the latter, means on said carriage means for causing the transverse shifting of said dislodging means, and means for driving said dislodging means comprising power take-off means drivingly engaged by one of said reaches.

8. In apparatus for long wall mining, a conveyor adapted to be positioned to extend along the mine wall and comprising a stationary conveyor frame and an endless conveyor belt having a pair of reaches movable along said frame and at least one of which reaches is a mined-material propelling reach, means for driving said belt to advance said reaches, carriage means supported by said frame for movement thereon along said wall, a slide movable on said carriage means in a direction transverse to said conveyor, material dislodging means supported by said slide and shiftable by the latter into engagement with said wall, power means effective between said carriage means and said slide for actuating the latter, said dislodging means being adapted to be driven while in engagement with said wall, means for driving said dislodging means comprising power take-off means on said carriage means and drivingly engaged by the other of said reaches, and means operable to propel said carriage means along said conveyor frame.

9. In apparatus for long wall mining, a conveyor adapted to be positioned to extend along the mine wall and comprising a stationary conveyor frame and an endless conveyor belt having reaches movable along said frame, means for driving said belt to advance said reaches, carriage means supported by said frame for movement thereon along said wall, material dislodging means on said carriage means comprising cutting means movable relative to said carriage means and engageable with said wall and adapted to be driven, and power take-off means on said carriage means and connected with said cutting means to drive the same, said power take-off means comprising driven roller means adjacent one of said reaches and backing roller means for pressing said one reach into driving engagement with said driven roller means.

10. In apparatus for long wall mining, a conveyor adapted to be positioned to extend along the mine wall and comprising a stationary conveyor frame and an endless conveyor belt having reaches movable along said frame, means for driving said belt to advance said reaches, carriage means supported by said frame for movement thereon along said wall, a slide movable on said carriage means, material dislodging means on said slide comprising a cutter head having an actuatable cutting means engageable with said wall and a drive shaft for said cutting means, power means effective between said carriage means and said slide for actuating the latter, power take-off means drivingly engaged by one of said reaches and including a rotatable drive member, and a spline connection between said drive member and said drive shaft.

11. In mining apparatus, a conveyor comprising a stationary conveyor frame and endless conveyor belt means having reaches movable along said frame and at least one of which reaches is a mined material propelling reach, a carriage supported on said frame and movable therealong, means operable to drive said belt means, generating apparatus on said carriage including an electrical generator, and power take-off means engaged and driven by the other of said reaches and connected with said generator to actuate the same.

12. In mining apparatus, a conveyor comprising a stationary conveyor frame and endless conveyor belt means having reaches movable along said frame and at least one of which reaches is a mined material propelling reach, a carriage supported on said frame and movable therealong, means operable to drive said belt means, generating apparatus on said carriage including a fluid pressure generating pump means, storage tank means connected with said pump means to receive pressure fluid therefrom, and power take-off means engaged and driven by the other of said reaches and connected with said pump means to drive the same.

References Cited in the file of this patent

UNITED STATES PATENTS

| | | |
|---|---|---|
| 2,096,910 | McIntosh | Oct. 26, 1937 |
| 2,143,789 | Moore | Jan. 10, 1939 |
| 2,238,346 | Sorensen | Apr. 15, 1941 |
| 2,539,022 | Kreider | Jan. 23, 1951 |
| 2,592,996 | Anderson | Apr. 15, 1952 |
| 2,671,653 | Sheppard | Mar. 9, 1954 |
| 2,690,834 | Lundquist | Oct. 5, 1954 |
| 2,745,651 | Herrmann | May 15, 1956 |
| 2,753,169 | Joy | July 3, 1956 |
| 2,767,970 | Paul | Oct. 23, 1956 |
| 2,788,201 | Lindgen et al. | Apr. 9, 1957 |

FOREIGN PATENTS

| | | |
|---|---|---|
| 159,385 | Australia | Oct. 19, 1954 |
| 576,663 | Great Britain | Apr. 15, 1946 |